Figure 10:
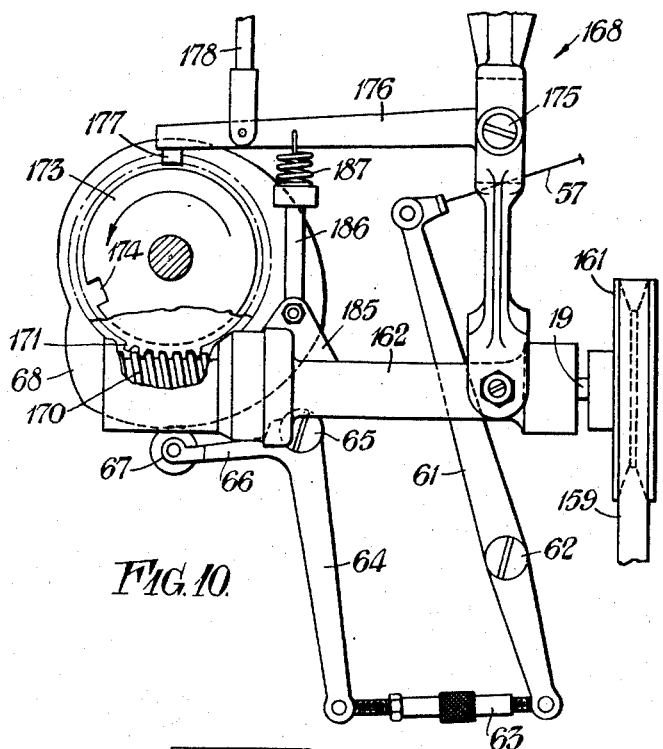

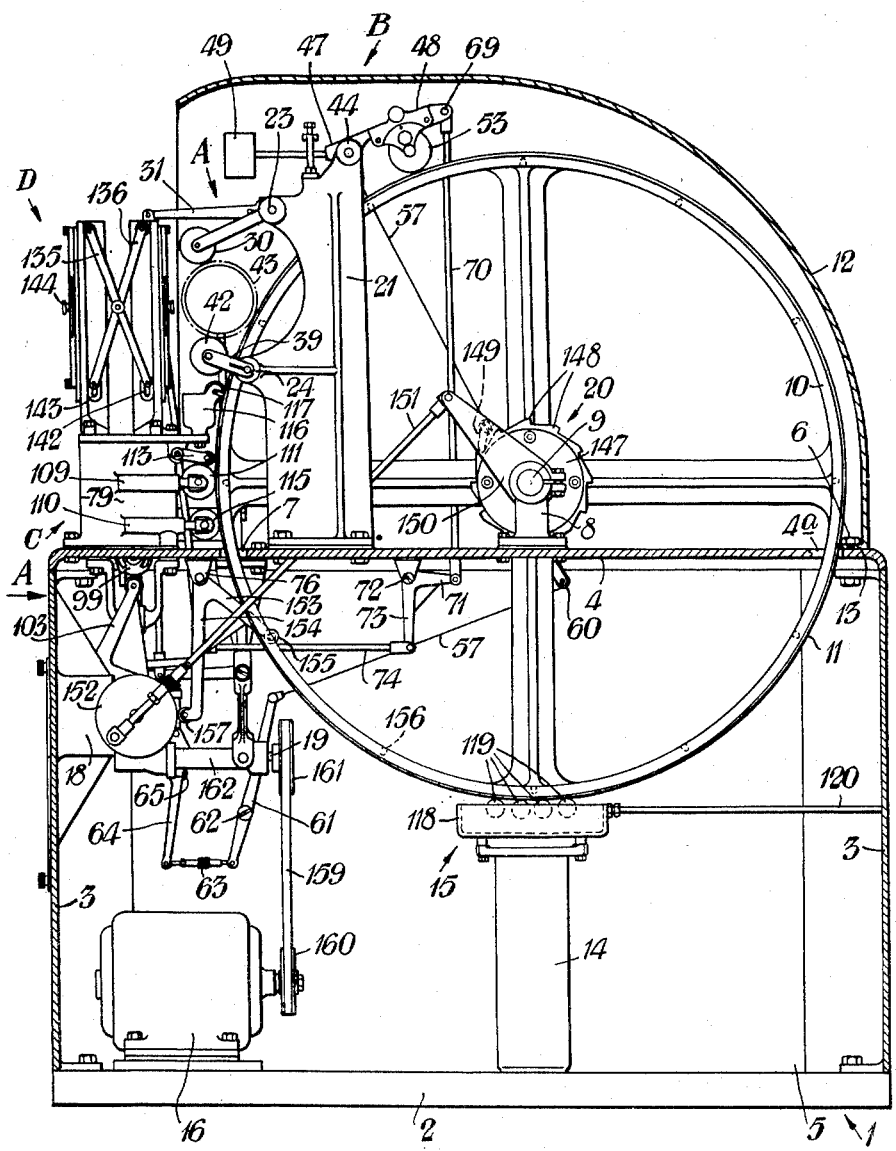

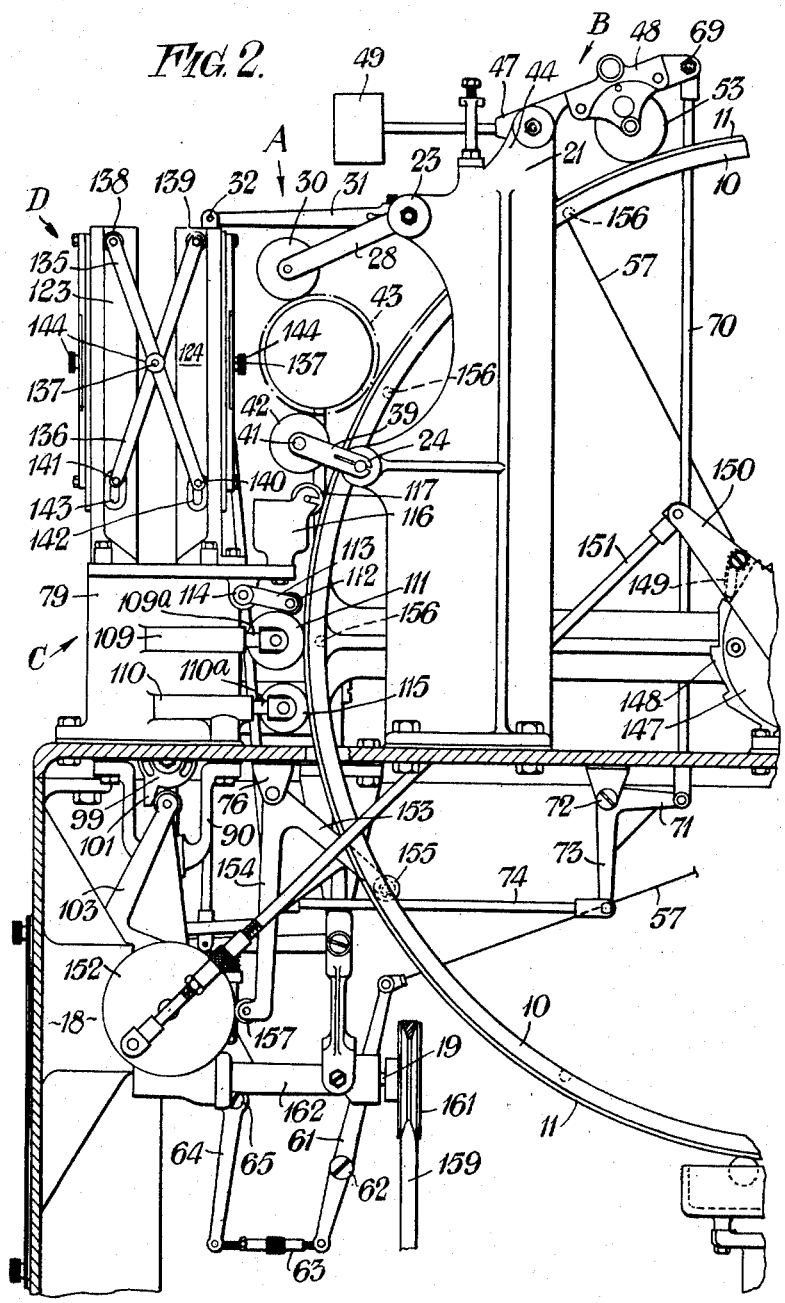

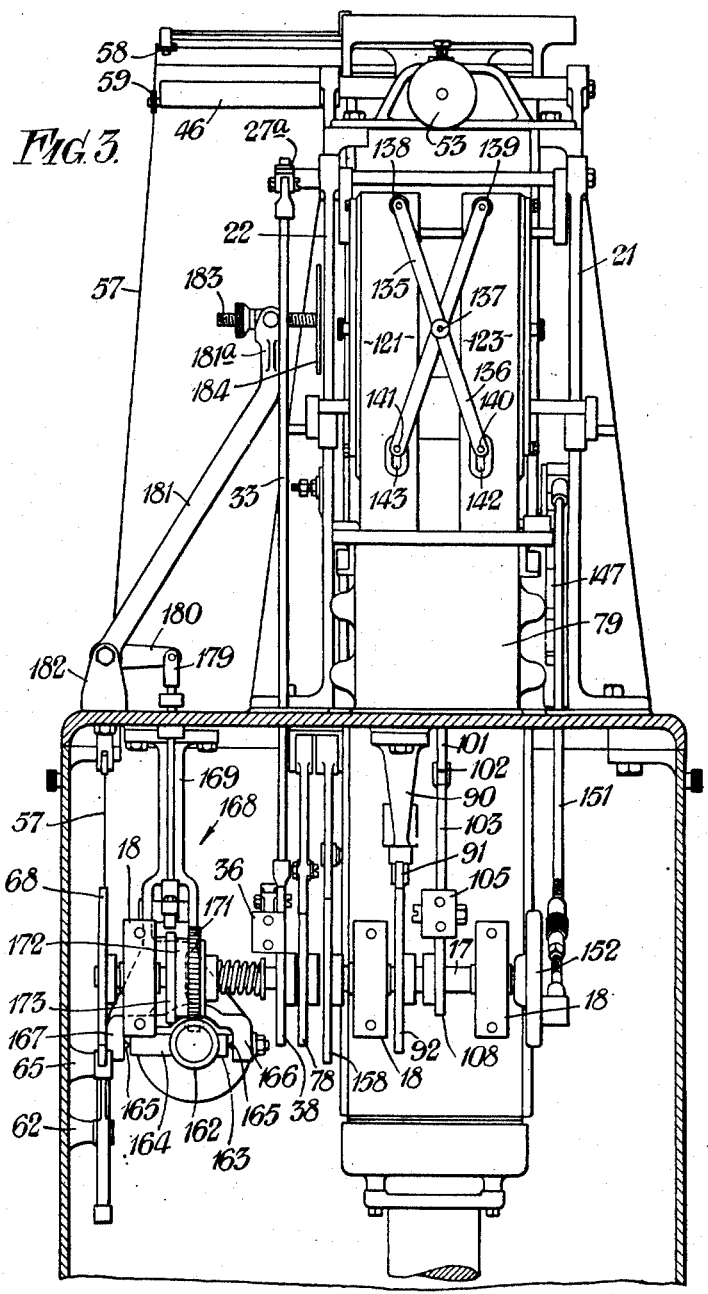

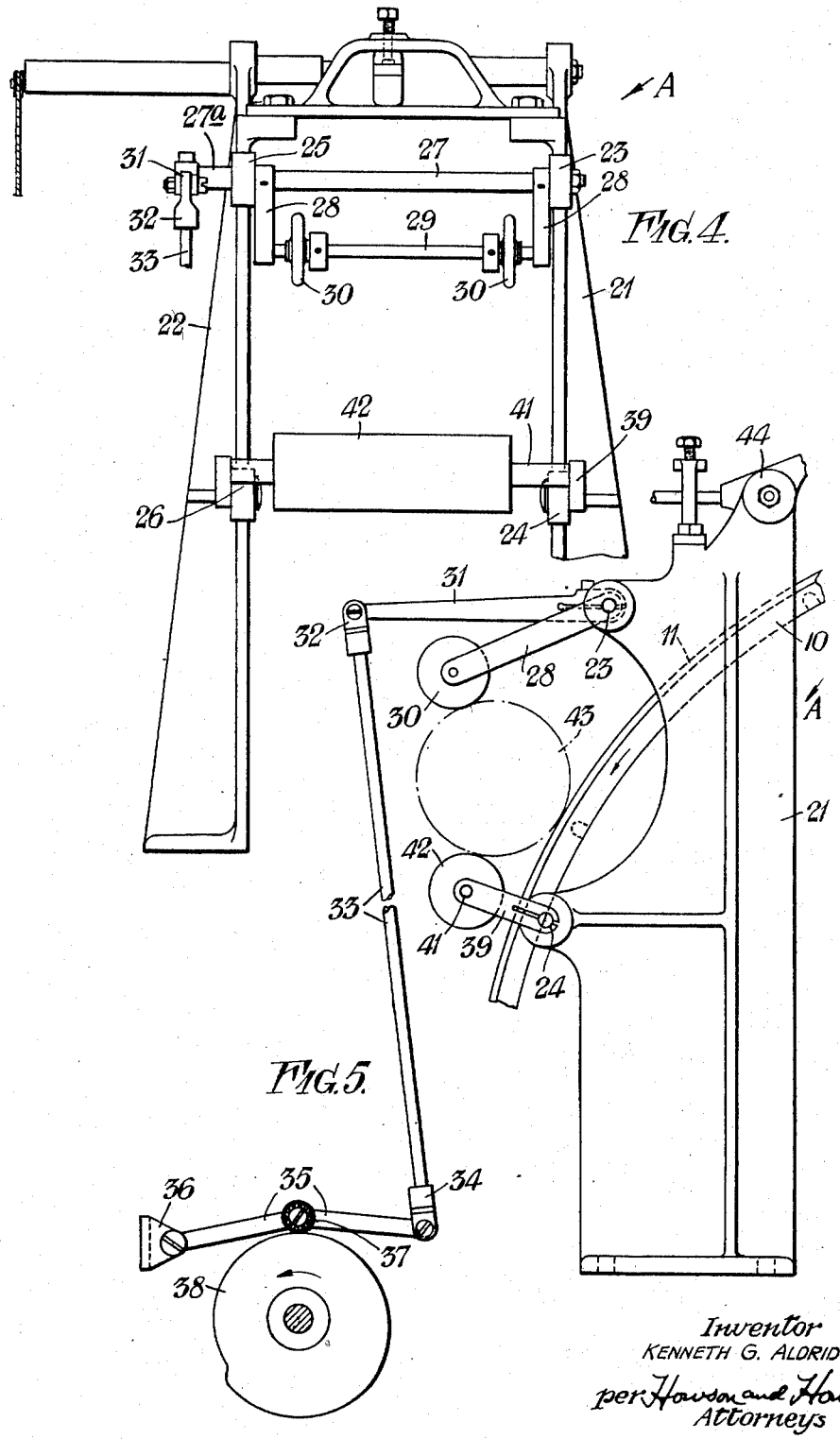

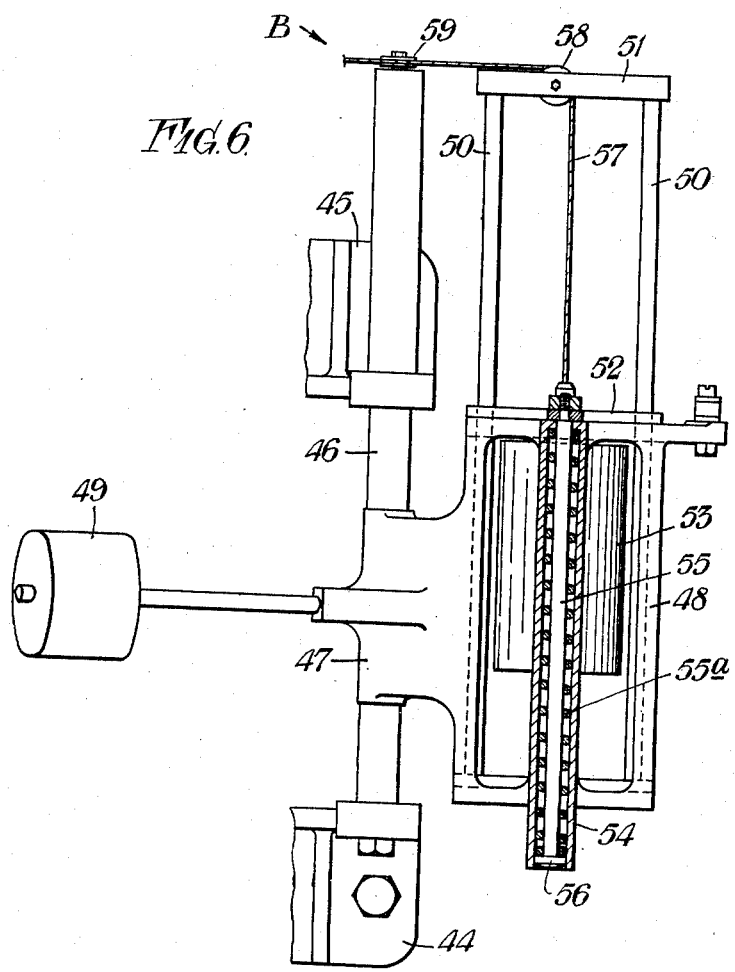

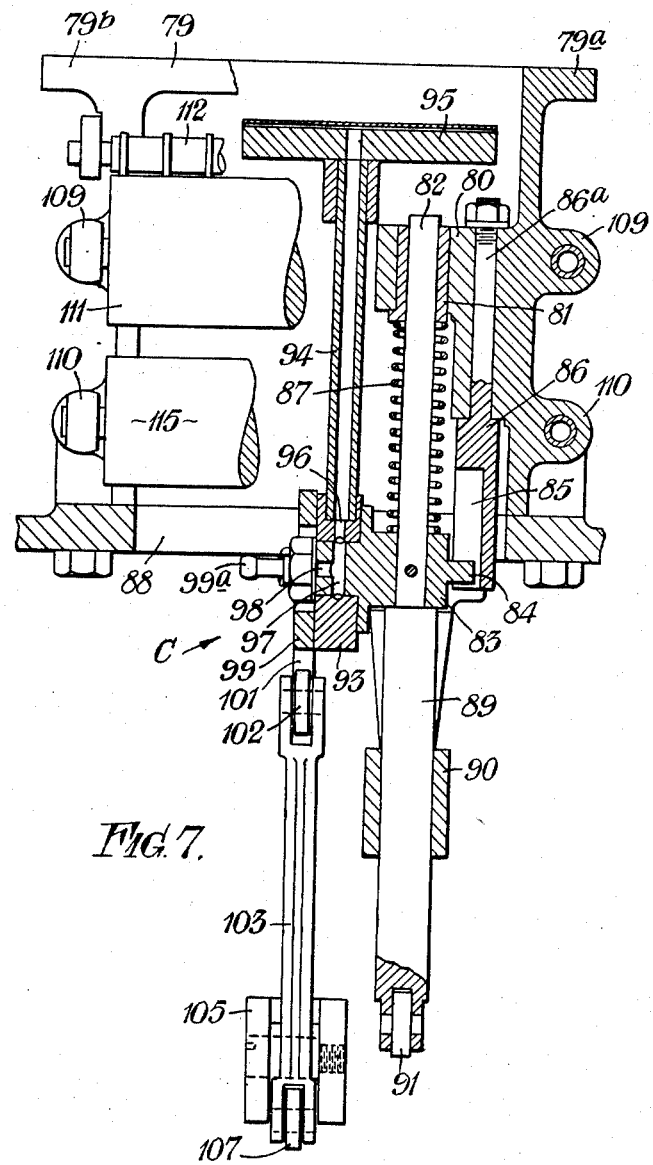

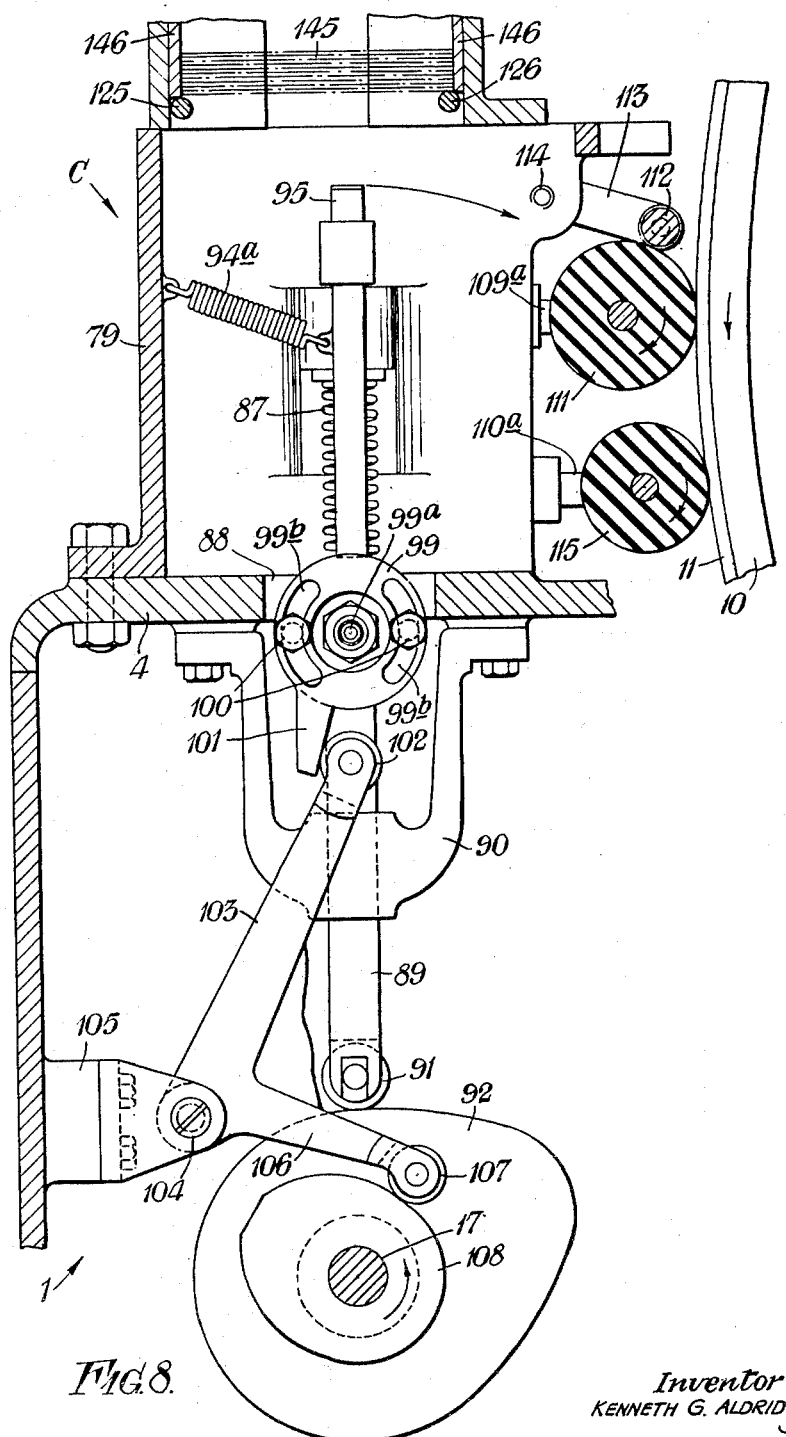

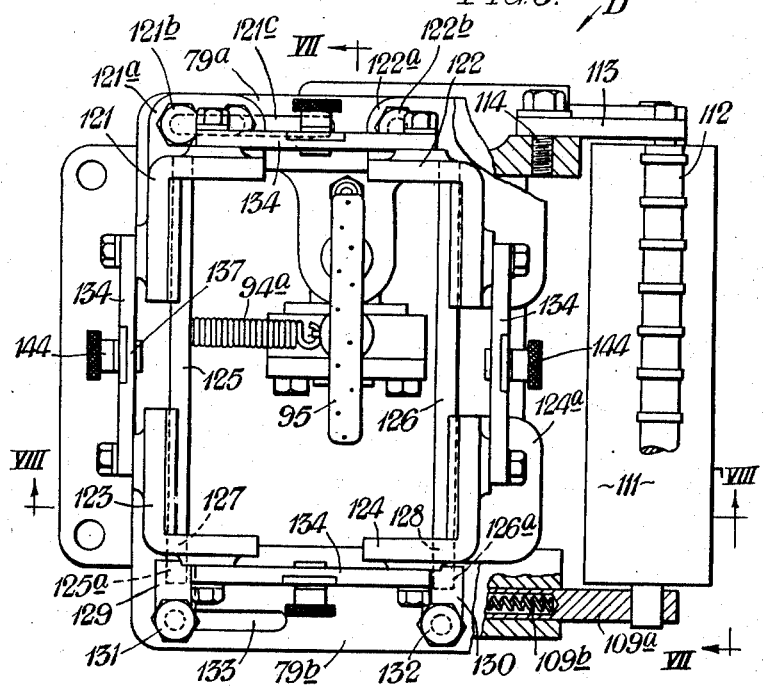

Feb. 23, 1954 K. G. ALDRIDGE 2,669,796
TRANSFER APPLYING DEVICE FOR GLASS, CERAMIC, AND OTHER WARE
Filed April 6, 1951

Inventor
KENNETH G. ALDRIDGE
per Howson and Howson
Attorneys.

Feb. 23, 1954 K. G. ALDRIDGE 2,669,796
TRANSFER APPLYING DEVICE FOR GLASS, CERAMIC, AND OTHER WARE

Inventor:
KENNETH G. ALDRIDGE
per Howson and Howson
Attorneys.

Patented Feb. 23, 1954

2,669,796

UNITED STATES PATENT OFFICE 2,669,796

TRANSFER APPLYING DEVICE FOR GLASS, CERAMIC, AND OTHER WARE

Kenneth Godfrey Aldridge, London, England, assignor to Johnson, Matthey & Company Limited, London, England, a British company Application April 6, 1951, Serial No. 219,743

Claims priority, application Great Britain April 21, 1950

10 Claims. (Cl. 41—1)

This invention relates to improvements in and relating to the decoration of glassware, ceramic ware or other ware by means of transfers.

A transfer for application to glass-, ceramic- or other ware normally consists of a gummed paper backing, the gummed side of which carries a transparent film of collodion, cellulose acetate or similar substance onto which the design or other decoration to be transferred is applied.

The application of such a transfer to an article, to be decorated by the design or decoration, is usually effected by a hand operation. For this purpose the transfer is first wetted to soften the interlayer of gum, whereupon the collodion or other film carrying the design is detached by hand from the paper backing and slid on to the article, which is subsequently fired to burn away the organic matter and leave the design firmly adhering to the article.

Such a method of procedure is obviously slow and renders the decoration of relatively cheap articles, such as milk or beer bottles, in large numbers an expensive operation. Consequently, the decoration of such articles with names, trademarks or labels by means of transfers, has not found favour owing to the fact that the cost of decoration is out of proportion to the initial cost of the articles and their comparatively short life in daily use.

A further disadvantage is that considerable care is required in the application of the transfer in order to ensure that the applied design is accurately positioned on the ware and to prevent the occurrence of creases which have to be smoothed out.

In order to overcome these disadvantages, it has already been proposed to provide mechanical means for applying transfers to bottles and the like comprising a continuously or intermittently horizontally movable conveyor belt on to which the transfers are placed at spaced intervals by an operator so as to pass successively wetting means for the transfer, comprising vertically reciprocable pads, suitably supplied with heated water, a backing remover comprising a vertically reciprocable and laterally displaceable wiper pad and a ware-support-station located above the belt near the rear end of the belt run, the conveyor belt being periodically raised so as to cause a transfer thereon to contact the ware, e. g. a milk bottle, and to wind itself around the bottle.

The movement of the various mechanisms is effected by means of pressure fluid-actuated pistons operated in required sequence by the depression of a foot-pedal by a second operator who also places the bottles in, and removes them from, the ware support.

The principal object of this invention is to provide an improved apparatus for automatically applying transfers to glass, ceramic or other ware, which is of simple construction and occupies a comparatively small space.

Another object is to provide an apparatus which requires the attention of only a single operator.

A further object is to provide an improved apparatus enabling the continuous application of transfers to milk bottles, beer bottles or other articles, and which will remain in operation provided an article to be decorated is in position therein.

A still further object of the invention is to provide an apparatus by means of which transfers are automatically fed to an intermittently rotatable drum, which carries the said transfers progressively to a position whereat the transfer backing paper is automatically removed and then to a position whereat the transfer is automatically transferred to an article to be decorated.

With these and other objects in view, the invention broadly comprises an apparatus for applying transfers to glass-, ceramic- or other ware, comprising essentially a rotatable drum or the like having means on the periphery thereof adapted to retain a transfer thereon, automatic transfer feed mechanism associated with said drum, automatic backing removing mechanism and releasable ware supporting means also associated with said drum, said transfer feed mechanism, backing-removing mechanism and ware supporting means being located at spaced positions around the periphery of said drum, and means for rotating said drum and for actuating said ware supporting, transfer feed and transfer backing-removing mechanisms in required sequence.

The features of the invention will be more readily understood by reference to the accompanying drawings, given solely by way of illustrative example, and not in any way as limitative, the scope of the invention being defined in the appended claims.

Figure 11:
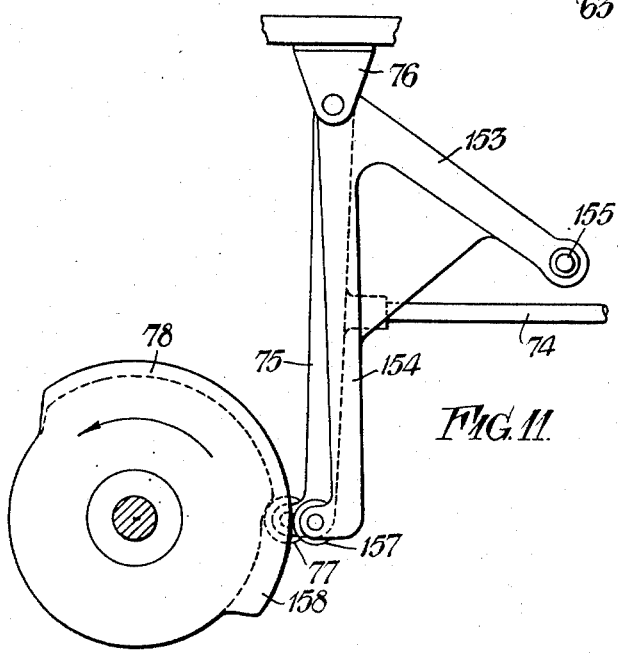

In the drawings:

Figure 1 is a part sectional side elevation of a transfer applying machine embodying the features of the invention, Figure 2 is a similar view to a larger scale of part of Figure 1, Figure 3 is a part sectional end view of Figure 1, looking in the direction of the arrow A of Figure 1, the lower portion of the frame being cut away, Figure 4 is a front view, drawn to a larger scale than Figure 1, of the ware supporting means shown in that figure, Figure 5 is a side view of Figure 4, showing also the operating mechanism therefor, Figure 6 is a plan view, also drawn to a larger scale than Figure 1, of the transfer backing removing mechanism shown in Figure 1, Figure 7 is a section, also drawn to a larger scale than Figure 1, of the transfer feed mechanism, the section being taken on the line VII—VII of Figure 9, Figure 8 is a section on the line VIII—VIII of Figure 9, Figure 9 is a plan view of the transfer carrying magazine, showing the details of construction thereof, Figure 10 is a detail view showing the construction and operation of the worm drive mechanism and its associated bottle actuated control, Figure 11 is a detail view showing the drum register stop and its associated mechanism and Figures 12a–12f are views of the cams showing the relative contours thereof when the apparatus is inoperative.

Referring now to the drawings, and first to Figures 1–3, the apparatus comprises essentially a frame work indicated generally by the reference numeral 1, consisting of a base 2, opposed lateral sides 3, a horizontal top portion 4 and opposed longitudinal sides 5, only one of which is shown in Figure 1. The top portion 4 is formed with a slot 4a located slightly to one side of the longitudinal centre line thereof and extending over substantially ¾ of the length of the said top 4 from the point 6 adjacent one end thereof to the point 7. On the top portion 4 are mounted, intermediate the ends of the slot 4a, and one on either side of the said slot, a pair of opposed upstanding bearings 8 (only one of which is shown in the drawings) in which is rotatably mounted a shaft 9, carrying a drum 10, the peripheral surface of which is covered with a layer of resilient rubber 11. As clearly shown in Figures 1 and 2, the drum 10 extends through the slot into the interior of the framework 1, the exposed portion thereof being covered by a hood 12 bolted to the top 4 of the frame 1, as indicated at 13, Figure 1. In Figure 1 the left hand portion of the hood 12 has been cut away for the sake of clarity and only one bolt 13 is consequently visible.

On a support 14, mounted on the base 2, is carried a transfer wetting bath 15 and the base 2 also carries an electric motor 16, driven from a suitable source of current supply, not shown.

Around the periphery of the drum 10 are located at spaced positions therearound, a ware-supporting device and a transfer-backing removing mechanism, indicated generally in Figures 1 and 2 by the reference letters A and B respectively. Mounted on the top portion 4 of the frame 1 at the end thereof beyond the end 7 of the slot 4a is a transfer feed mechanism indicated generally by the reference letter C (Figures 1–3) and above this mechanism is carried a transfer-carrying magazine indicated generally in Figures 1–3 by the reference letter D.

A cam shaft 17, Figure 3, carrying a plurality of cams for actuating the above mentioned mechanisms A, B, C and D is rotatably mounted in three spaced bearings 18 carried by a lateral side 3 of the frame 1 beneath the top 4.

The cam shaft 17 is driven by a main driving shaft 19 actuated by the motor 16.

The drum 10 is intermittently rotated by means of a pawl and ratchet mechanism 20 actuated by the cam shaft 17.

With the above description of the general layout of the apparatus and the relative position of the various mechanisms, the construction and operation of these mechanisms A, B, C and D will now be described in detail.

*Ware-supporting device "A" and associated mechanism*

Referring now more particularly to Figures 3, 4 and 5, 21 and 22 are a pair of pedestals bolted to, so as to extend upwardly from, the top portion 4 of the frame 1, one located on each side of the slot 4a adjacent the end 7 thereof. The pedestals 21 and 22 are each provided with a pair of spaced laterally projecting extensions 23, 24 and 25, 26 respectively; the upper extensions 23 and 25 project beyond the periphery of the drum 10 and form supporting bearings for a rod 27 to which are fixed spaced arms 28, the outer ends of which carry a rod 29 on which are rotatably and fixedly slidably mounted a pair of bottle or other ware clamping wheels 30.

The rod 27 extends outwardly of the bearing 25 and to the free end 27a thereof is fixed one end of an arm 31 (Figure 5), to the other end of which is pivoted the upper end 32 of a downwardly extending lever 33, the lower end 34 of which is pivoted to one end of a cranked arm 35, the other end of which is pivoted to a bracket 36 fixed to the adjacent side 3 of the frame 1. Intermediate the ends of the arm 35 is mounted a roller 37 which engages the periphery of a cam 38 (see also Figure 3), fixedly mounted on the aforesaid cam shaft 17.

To each of the lower bearings 24 and 26 is pivoted one end of an arm 39 and 40 respectively, the outer ends of which arms carry a rod 41 on which is mounted a roller 42. As will be described hereafter, the wheels 30 and the roller 42 cooperate to support and releasably clamp an article to be decorated, such as a beer bottle as indicated in dotted lines at 43 in Figures 1, 2 and 5.

*Transfer backing removing mechanism "B"*

The transfer backing removing mechanism B is pivotally mounted on the upper ends 44 and 45 of the aforesaid pedestals 21 and 22 so as normally to lie immediately over the periphery of the drum 10.

Referring now more particularly to Figure 6, it will be seen that this mechanism consists of a rod 46 carried by the said ends 44 and 45 of the pedestals 21 and 22 so as to extend transversely of the drum 10 and projecting laterally of the pedestal 22. On this rod 46 between the said pedestals 21 and 22 is pivotally mounted a sleeve 47 forming a lateral extension of a rectangular frame 48 which lies over the drum 10 to one side of the rod 46 and is counterbalanced by a counterbalance weight 49.

Extending rearwardly of the frame 48 are a pair of guides 50 connected at their outer ends by a transverse bar 51, on which guides is slidably mounted a carriage 52, on the underside of which is carried a roller 53.

The frame 48 is formed, on the upper side thereof, with a tubular portion 54, in the bore of which is slidable a rod 55 secured at one end thereof to the carriage 52 and having at the other end a head 56 and of smaller diameter than the internal diameter of the tube 54, a compression spring 55a being housed in the said bore so as to surround the rod 55.

The carriage 52 and roller 53 are normally located beneath the frame 48 so as to lie over, with the roller 52 in light frictional engagement with the drum 10 and are slidable on the guides 50 against the action of the spring 55a for the purpose of removing the backing paper from a transfer carried by the drum 10. To the rear of the carriage 52 is secured one end of a cable 57 which passes over guide pulleys 58 and 59, carried respectively by the bar 51 and the rod 46, and a pulley 60 carried by the underside of the top portion 4 of the frame 1 and is secured at its other end, see Figures 1, 2 and 10, to one arm of a double-armed lever 61 pivoted at 62 to the rear side 5 of the frame 1, the other arm of which lever 61 is connected by an adjustable coupling 63 to one arm 64 of a bell-crank lever, pivoted at 65 to the frame side 5, the other arm 66 of which carries a roller 67 engaging the periphery of a cam 68 mounted on the outer end of the cam shaft 17 (Figure 3). As will be appreciated, rotation of the cam 68 will cause the periodic sliding of the carriage 52 and roller 53 transversely of the drum 10 against the action of the spring 55a.

As previously pointed out the backing remover B is pivoted to the pedestals 21 and 22 at 44, 45 and is swingable around its pivot for the purpose of raising the roller 53 slightly above the surface of the drum 10 when the carriage 52 is in the retracted position to allow of its return to normal position before reengaging the drum 10.

For this purpose, there is pivoted to the frame 48 at 69 one end of a depending rod 70, the other end of which is pivoted to one arm 71 of a bell-crank lever pivoted at 72 to the underside of the top frame portion 4, the other arm 73 of the lever being pivoted to one end of a horizontal rod 74, the other end of which is pivoted to a lever 75 (Figure 11) pivoted to a bracket 76 secured to the underside of the top portion 4 so as to depend therefrom and carrying at its lower end a roller 77 which rides over the surface of a cam 78 mounted on the aforesaid cam shaft 17.

*Transfer feed mechanism "C"*

Referring now more particularly to Figures 7 and 8, the transfer feed mechanism is shown to consist of a rectangular open-ended casing 79 (shown in elevation in Figures 1–3), which is bolted to the upper side of the top portion 4 of the frame 1 at the part thereof which extends beyond the end 7 of the slot 4a formed in the said top. The top of the casing is formed with two opposed externally extending flanges 79a and 79b.

Mounted in an inwardly extending bearing bracket 80 integral with the casing 79 is a bushing 81 in which is slidably mounted the upper end of a vertically extending rod 82, the lower end of which is carried in a boss 83 having a lateral projection or pin 84 thereon slidably engaging a guideway 85 formed in an insert guide block 86 secured to the wall of the casing 79 by a bolt 86a. A coil spring 87 surrounds the rod 82 and abuts against the bushing 81 and the boss 83 at its upper and lower ends respectively.

The rod 82 and boss 83 extend through an aperture 88 formed in the top portion 4 of the frame 1, the under side of the said boss 83 engaging the upper end of an operating rod 89 slidably mounted in a yoke 90 secured to the underside of the top 4 and embracing the aperture 88. The rod 89 carries at its lower end a roller 91 maintained in constant engagement with a cam 92 mounted on the cam shaft 17 (see also Figure 3), whereby the boss 83 may be moved upwardly on rotation of the cam shaft 17.

On the side of the boss 83, opposite to that carrying the pin 84 is turnably mounted a sleeve 93 from which extends upwardly a hollow rod or tube 94, carrying at its upper end a suction pad 95, the tube 94 being of such a length that in the normal lowered position of the boss 83, shown in Figure 7, the suction pad 95 is located beneath the upper surface of the casing 79. The sleeve 93 is formed with a radial passage way 96 communicating at one end with the bore of the tube 94 and at the other end with an annular passageway 97 formed in the boss 83, which passageway 97 is in communication with a passageway 98. The sleeve 93 is retained in position by a circular closing plate 99 secured to the sleeve 93 by bolts 100. A nipple 99a adapted for connection to a suction pump (not shown) is bolted to the plate 99.

The plate 99 is provided with a depending projection 101 with which engages a roller 102 carried at the outer end of one arm 103 of a bell-crank lever pivoted at 104 to a bracket 105 carried by the frame 1, and the other arm 106 of which carries a roller 107 which engages and rides over the surface of a cam 108 mounted on the cam shaft 17. On the rotation of the cam 108 by the cam shaft 17, the suction pad 95 is tilted in the direction of the drum 10. The plate 99 is provided with two opposite segmental slots 99b through which the said bolts 100 pass, in order to enable the position of the projection 101 to be adjusted as desired with respect to the roller 102 for the purpose of varying the amount of tilting imparted to the suction pad 95. A tension spring 94a secured to the tube 94 and the inner wall of the casing 79 is provided for returning the suction pad 95 and tube 94 to their normal position.

Extending laterally from opposite ends of the casing 79 on the side thereof facing the drum 10 are two pairs of boss-like projections 109 and 110, the upper pair 109 forming bearings in which are carried rods 109a, urged outwardly in the direction of the drum 10 by means of springs 109b, only one of which is shown in Figure 9. The outer ends of the rods 109a form bearings for a transfer feed roller 111, which is constantly urged into contact with the periphery of the drum 10 under the action of the aforesaid springs 109b. The roller 111 is formed of rubber or other composition having a resiliency less than that of the rubber layer 11 of the drum 10.

Above the roller 111 is mounted a smaller roller 112 carried by the outer ends of arms 113, the other ends of which are pivoted to the casing 79 at 114. The roller is maintained in contact with the feed roller 111, which is so located that the bite between the two rollers 111 and 112 lies in the path of tilting movement of the suction pad 95, whereby, as will appear hereafter, a transfer carried by the pad 95 will be fed between the said rollers 111 and 112 and by them onto the drum 10.

The lower pair of projections 110 similarly carry rods 110a (only one of which is shown in Figure 8), the outer ends of which form bearings for a squeegee roller 115, similar to the roller 111 and likewise spring pressed into engagement with the periphery of the drum 10.

Referring again to Figures 1 and 2, 116 represents a waterbath mounted on a lateral extension of the casing 79 in which is freely rotatably mounted a drum-wetting roller 117, which is maintained in contact with, and is driven by, the drum 10. By this means on rotation of the drum 10, water contained in the bath 116 will be transferred to the surface of the drum for the purpose of moistening the said surface prior to the application thereto of a transfer as hereinafter described.

Transfer wetting bath

The transfer wetting bath 15 consists of a container or vessel 118 (Figure 1) and carries freely rotatably mounted therein four rollers 119, which project above the upper edge of the vessel 118 and are spring loaded, in any suitable manner not shown in the drawing, into contact with the periphery of the drum 10, so as to be rotated thereby. The vessel 118 is kept supplied with water from a suitable source through a feed pipe 120 so as to maintain the water level constant.

Transfer carrying magazine "D"

Referring now to Figures 3 and 9, and more particularly to Figure 9, the transfer carrying magazine "D" is composed of four elongated L-shaped strips 121, 122, 123 and 124, the strips 121, 122 and 124 being formed at their lower ends with laterally extending feet 121a, 122a and 124a on which the said strips are supported on the top of the casing 79, so as to extend vertically upwards therefrom. The strips 121 and 122 are mounted on the said flange 79a by means of bolts 121b and 122b respectively, the bolt 122b being fixed and the bolt 121b being slidable in a slot 121c formed in the flange 79a.

Fixed to the strips 121 and 122 respectively adjacent the lower ends thereof, are two rods 125 and 126, which extend parallel to one another along opposite sides of the magazine and project through slots 127 and 128 formed in the strips 123 and 124 respectively, the projecting ends 125a and 126a fitting into tubular sleeve members 129 and 130 respectively, each of which is formed with a transverse hole for the reception of a bolt 131 and 132. The bolt 131 is slidable in a slot 133 formed in the flange 79b of the casing 79 and the bolt 132 is fixed to the said flange.

The strips 121, 122, 123 and 124 are mutually interconnected by four "lazy tongs" devices 134, each of which consists of a pair of crossed-over struts 135 and 136 (see figures 1-3) pivoted together at 137, and pivoted at their upper ends 138 and 139 each to one of said strips, for example the strips 123 and 124 as shown in Figures 1 and 2 or the strips 121 and 123 as shown in Figure 3. The lower ends 140 and 141 of the struts are slidable in elongated slots 142 and 143 formed in the said strips 124 and 123 respectively or 123 and 121 respectively as the case may be. Locking screws 144 are provided for locking the struts in any required relative position.

By means of the above construction, the size of the transfer magazine D, that is to say, the area of the space defined by the strips 121, 122, 123 and 124 may be increased or decreased as desired. By releasing the bolts 121b and 131 and the pertaining locking screws 144, the strips 121 and 123 may be moved in the slots 121c and 133 towards and away from the other strips 122 and 124, whilst by releasing the other opposed pair of locking screws 144, the strips 123 and 124 may be moved on the rods 125 and 126 towards and away from the strips 121 and 122. The size of the magazine may thus be varied in one or other of two directions or in both said directions simultaneously.

The rods 125 and 126 form, as clearly shown in Figure 8, supports for a pile of transfers 145 within the magazine. In order to ensure ready withdrawal of successive transfers by the suction pad 95, as hereinafter described, it has been found desirable to provide spacing members 146, between the edges of the transfers and the inner faces of the strips 121—124, which spacing members rest on the rods 125 and 126.

Drum operating mechanism

Referring now to Figures 1-3, the drum 10 is intermittently rotated by means of a ratchet wheel 147 mounted on the shaft 9 and fast with the said drum 10. The ratchet wheel 147 is provided with twelve teeth 148, with which engages a pawl 149 pivoted to a crank arm 150 swingably mounted on the shaft 9. To the free end of the crank arm 150 is pivoted one end of a rod 151, the other end of which is pivoted to a crank disc 152 adjacent the periphery thereof, which disc 152 is mounted on one end of the aforesaid cam shaft 17. Each complete rotation of the cam shaft 17 thus oscillates the crank arm 150 to cause the pawl 149 to engage a tooth 148 on the ratchet wheel 147 thereby rotating the drum 10 through part of a complete rotation, and then to become disengaged therefrom. As there are twelve teeth on the ratchet wheel 147, twelve complete rotations of the cam shaft are required to effect one complete rotation of the drum 10.

For the purpose of locking the drum 10 in each intermediate stationary position thereof, a two-armed or bell-crank lever 153, 154, is pivoted to the aforesaid bracket 72 carried on the underside of the frame top portion 4 (see Figure 11). One arm 153 of this lever is provided at its free end with a pin 155 adapted to engage any one of twelve uniformly spaced slots 156 formed in the interior peripheral surface of drum 10, whilst the other arm 154 carries at its free end a roller 157 which engages and rides over a cam 158 mounted on the cam shaft 17.

Cam shaft drive and associated mechanism

Referring now to Figures 1, 2, 3 and 10, the cam shaft 17, as previously mentioned, is driven by the drive shaft 19 from the electric motor 16.

This is effected by means of an endless belt 159, which passes over a pulley 160 carried by the motor shaft and a pulley 161 mounted on the inner end of the drive shaft 19.

The shaft 19 is mounted in a tubular sleeve or casing 162 from which project adjacent one end and laterally on either side thereof extension members 163 and 164 by means of which the sleeve 162 is supported by pins 165 between the side arms 166 and 167 of a yoke member 168, having a central upwardly extending arm 169, which is secured to the underside of the frame top 4.

The drive shaft 19 carries, at the end thereof opposite to that carrying the pulley 161, a worm 170, which is adapted to mesh with a worm wheel 171 mounted on the cam shaft 17. The said worm-wheel 171 is rotatably mounted on the cam shaft 17 and is coupled thereto through the medium of friction clutch 172 fast on the said cam shaft. Integral with the clutch 172 is a disc 173 having a peripheral slot 174 therein (see Figure 10).

Pivoted to the yoke 168 at 175, above the drive shaft 19, is an arm 176 which extends over the aforesaid disc 173 and is provided adjacent its outer end with a depending projection or pin 177 adapted to engage the slot 174 when the latter is rotated to its uppermost position beneath the said pin 177.

Pivoted to the said arm 176 intermediate the ends thereof is one end of a lever 178 which extends upwardly and is connected at its upper end 179 to one arm 180 of a bell-crank lever 180, 181 (Figure 3), pivoted to an upstanding bracket 182 secured to the frame top 4. The other arm 181 of the bell-crank lever extends upwardly at an angle of about 40° to the horizontal and is formed with a vertical end portion 181a terminating at a point lying between and to the rear of the rollers 30 and 42 of the ware-supporting device A.

The upper end of this arm 181 carries a laterally extending screwed rod 183 on the outer end of which is mounted a disc 184 which is engaged by a bottle 43 inserted into the ware supporting device A. When there is no bottle in the device A, the bell-crank lever 180, 181 takes up such a position that the disc 184 lies within the space to be occupied by a bottle when inserted and the pin 177 will fall into the slot 174 when the latter is in its uppermost position.

A bracket 185, Figure 10, upstanding from the sleeve 162 has pivoted thereto a rod 186 carrying a tension spring 187 connected to the arm 176. Movement of the arm 176 around its pivot 175 thus causes a similar movement of the drive shaft 19, around its pivot pin 165, so that when the pin 177 is in engagement with the slot 174, the worm 170 is moved downwardly out of engagement with the worm wheel 171 and the cam shaft 17 is held stationary.

When a bottle 43 is inserted in position in the supporting device A, it comes into contact with the disc 184 and moves it rearwardly thereby swinging the bell-crank 180, 181 around its pivot 182 to swing the arm 180 thereof upwardly thereby raising the pin 177 out of contact with the slot 174 and simultaneously raising the worm 170 into engagement with the worm wheel 171 to couple the cam shaft 17 drivingly with the drive shaft 19.

Figures 12a to 12f show the cams 62, 38, 78, 158, 92 and 108 in their relative positions of rotation when the apparatus is stationary, that is to say, when the pin 177 is in engagement with the slot 174 in the disc 173, the worm 170 is disengaged from the worm wheel 171 and the drum retaining pin 155 is in engagement with one or other of the slots 156 in the drum 10.

*Operation*

The above described apparatus functions in the following manner:

Let it be assumed that the apparatus is being used for the first time and that the parts are in the normal inoperative position, that is to say, with the drive shaft 19 stationary, the worm 170 lowered out of engagement with the worm wheel 171 and the pin 177 in engagement with the slot 174, which is in its uppermost position, the roller 53 of the transfer backing remover B in its forward position over and in contact with the drum 10, the clamping wheels 30 in their raised position, the suction pad 95 in its lowermost retracted position, as shown in Figure 7, and the retaining pin 155 in engagement with a slot 156 to hold the drum 10 stationary. Let it also be assumed that a pile of transfers 145 have been placed in the magazine D, as shown in Figure 8, so as to rest on the rods 125 and 126, the size of the magazine having previously been adjusted in the manner above described to accommodate the particular size of transfer employed.

In this position of the parts, the various cams on the cam shaft will occupy the relative rotative positions shown in Figures 12a–12f.

To set the apparatus in motion, the motor 16 is first started so as to cause rotation of the drive shaft 19. An article to be decorated, in this instance a beer bottle, is then inserted horizontally in position over the squeegee roller 42 and in contact with the periphery of the drum 10 and is pressed against the disc 184, which is consequently displaced to swing the bell-crank lever 180, 181 on its pivot and lift the pin 177 out of the slot 174, thereby simultaneously raising the worm 170 into engagement with the worm wheel 171. The cam shaft 17 is thereby set in rotation and the following sequence of operations takes place during one rotation of the said cam shaft under the action of the aforesaid cams.

Figure 12A:
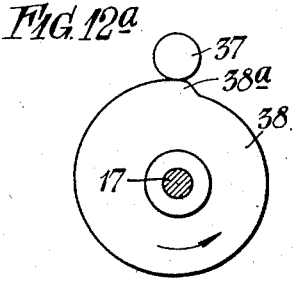
Figure 12B:
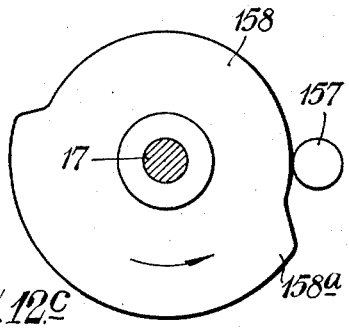

The initial rotation of the cam 38, Figure 12a, in the direction of the arrow, allows the roller 37 to move off the rising portion 38a of the cam 38 and to fall thereby swinging the arms 35, 33 and 31 downwardly which causes the arm 28 carrying the clamping wheels 30 to swing downwardly until the wheels 30 are pressed into engagement with the bottle 43 and clamp it into position. At the same time the roller 157, Figure 12b, rises on the surface 158a of the cam 158 to disengage the pin 155 from the slot 156 in which it is engaged, thereby releasing the drum 10. The disc 152, on the end of the cam shaft 17, has now been rotated to actuate the rod 151 and raise the crank arm 150 preparatory to causing the pawl 149 to engage one of the teeth 148 on the ratchet wheel 147 for the purpose of rotating the drum through the first stage of its intermittent movement.

During this half rotation of the cam shaft 17 the roller 67 rides over the raised portion 68a of the cam 68 (Figure 12d) to cause the lever 61 to swing around its pivot 62 and move the roller 53 of the transfer backing remover B transversely over the drum 10 against the action of the spring 55a.

Figure 12C:
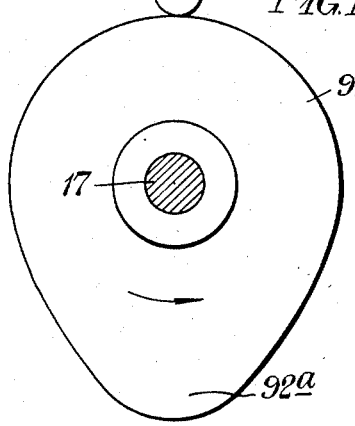
Figure 12D:
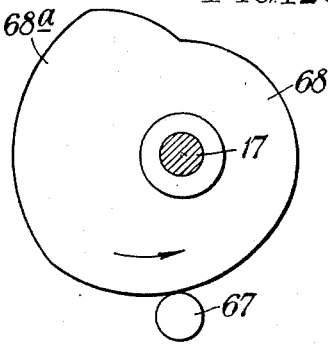
Figure 12E:
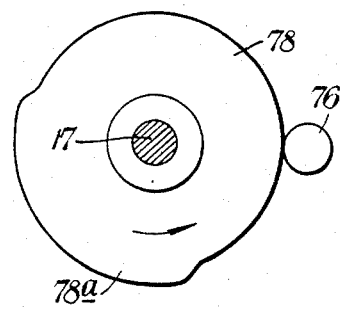

The cam 78, Figure 12e, then acts to lift the roller 53 and maintains it in the raised position to enable it to be returned under the action of the spring 55a, when the cam 68 becomes ineffective and the roller is again lowered into contact with the drum 10.

Figure 12F:
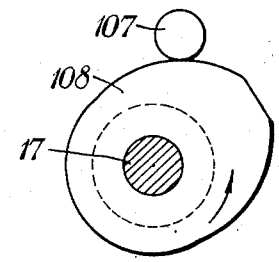

During this period the cam 108, Figure 12f, acts to tilt the suction pad 95 towards the drum 10; in subsequent cycles of operation the suction pad 95 will already have a transfer adhering to it and this tilting action will cause it to deliver the transfer between the bite of the rollers 111 and 112 and onto the drum 10, which at this stage is moving through its first stage of intermittent movement under the action of the pawl 149.

Towards the end of this first half rotation of the cam shaft 17 the suction pad 95 returns empty to its untilted position and the cam 92, acting on the roller 91, Figure 12c, causes the boss 83 to rise upwardly thereby raising the tube 94 carrying the suction pad 95 until, when the surface 92a of the said cam reaches its uppermost position, after the cam shaft 17 has completed half a revolution, the pad 95 comes into contact with the lowermost transfer of the pile 145 and causes the lowermost transfer to adhere to itself.

During this second half rotation of the cam shaft 17, the suction pad 95 is lowered with a transfer adhering thereto, and the intermittent movement of the drum 10 is completed.

During this movement of the drum 10, the bottle 43 is rotated, and towards the end of the movement, the clamping wheels 30 are raised to release the bottle 43. The bottle is not, however, removed, as otherwise the worm 170 would become disengaged from the worm wheel 171 when the slot 174 in the disc 173 arrived beneath the pin 177.

As will be readily appreciated during the above described initial sequence of operations, the backing remover mechanism B has operated without actually removing a transfer backing, as no transfer was present beneath the roller 53.

Continued rotation of the cam shaft 17 causes the above sequence of operations to be repeated for each revolution of the said shaft, a fresh transfer from the pile 145 being fed onto the drum 10 during each intermittent rotation thereof.

During this continued rotation, the transfers already deposited on the drum 10 are successively passed over the wetting rollers 119 in the wetting bath 15 until a stationary position of the drum 10 is reached at which the leading transfer is located immediately beneath the roller 53 of the backing-removing mechanism B. On the actuation of this mechanism in the above described manner, the transverse movement of the roller 53 causes the backing, which lies in contact with the said roller, to be stripped off the transfer. The backing is then removed from the roller in any suitable manner, before the latter returns to its operating position prior to the next intermittent movement of the drum 10.

During the next intermittent movement of the drum 10, the transfer from which the backing has been removed passes with the gummed surface now exposed beneath the rotating bottle 43. As the gummed surface of the transfer has a greater adhesion than that side thereof which is in contact with the drum 10, the transfer will be caused to leave the drum and wind itself around the bottle 43. The bottle is now released, and is withdrawn by the operator. The pin 177 is thus allowed to fall into contact with the surface of the disc 173. As, however, at this stage the slot 174 in the said disc 173 has not yet reached its initial position opposite the depending pin 177, the latter continues to ride over the surface of the disc. This time lag is sufficient to allow the operator to insert a fresh bottle in the ware-support, whereby the pin 177 is again raised and the apparatus continues in operation to cause the arrival beneath the bottle of the next succeeding transfer on the drum 10.

The apparatus, once started, may thus be continuously kept in operation, provided the operator removes a bottle as it is decorated and immediately replaces it by a fresh bottle. If, however, after removing a bottle, the operator does not insert a fresh bottle in place, the pin 177 will eventually drop into the slot 174 in the disc 173 with the consequent disengagement of the worm 170 from the worm wheel 171. The apparatus will thus be brought to a standstill, but the drive shaft 19 will continue to rotate.

It will be readily understood, from the above description, that once the drum 10 has completed one revolution, corresponding to twelve revolutions of the cam shaft 17, and the leading transfer has reached the ware-supporting mechanism A, each successive intermittent movement will cause a fresh transfer to be fed onto the drum 10, a bottle to be decorated and a transfer to be wetted by passage over the wetting rollers 119. Also during each stationary period of the drum 10, the backing is removed from the transfer immediately following the leading transfer.

The apparatus may in practice be satisfactorily run so as to decorate bottles at the rate of about 20 per minute.

Although in the above, one embodiment of the invention has been described by way of example, it is to be understood that modifications may be made therein without departing from the scope of the invention. For example, other driving mechanism, such as a Geneva gear, may be employed for rotating the drum, and the expandible transfer-carrying magazine described may be replaced by one of a number of magazines of different sizes corresponding to different sizes of transfers used.

Furthermore, the cam shaft need not be driven by the "drop-worm" mechanism described, as any other suitable driving mechanism may be employed.

Again, instead of positively actuating the various mechanisms by means of cam actuated levers, fluid pressure operated means may, if desired, be provided.

Moreover, automatic means may be provided for inserting a bottle into, and removing it from, the ware-supporting mechanism.

It will be appreciated that by means of my invention, there is provided a simple compact apparatus, which enables transfers to be rapidly automatically applied with accuracy to glass and ceramic ware and which requires the attention of only a single operator, the output of decorated articles over a given period being far greater than would be possible by a single worker undertaking the operation by hand.

What I claim is:

1. In apparatus for applying transfers to glass, ceramic and other ware to be decorated, the combination with an intermittently rotatable transfer-receiving drum, automatically operable transfer backing-removing mechanism and releasable ware-supporting means associated with said drum and common operating means for actuating said drum, backing-removing mechanism and ware-supporting means in required sequence, of a transfer feed mechanism also associated with said drum, said mechanism comprising an axially movable and bodily tiltable hollow suction rod; a suction pad mounted at one end of said rod; means operable by said common operating means for causing said rod to approach and move away from a pile of transfers; means for applying suction to said pad when said rod is in its forward position to cause a transfer to adhere to said pad; and means for tilting said rod and suction pad towards said drum so as to deliver said transfer on to said drum and for returning said rod to its initial position.

2. In apparatus for applying transfers to glass, ceramic and other ware to be decorated, the subcombination of a frame; a transfer-receiving drum rotatably mounted in said frame; means for intermittently rotating said drum; a housing mounted in said frame adapted to hold a supply of transfers; a transfer feed mechanism carried by said frame beneath said housing and adjacent the periphery of said drum, said transfer feed mechanism including a reciprocable and tiltable suction device for withdrawing a transfer from said supply and means for moving said transfer into contact with the periphery of said drum, and means for reciprocating and tilting said suction device in required sequence during each intermittent movement of said drum.

3. In apparatus for applying transfers to glass, ceramic and other ware to be decorated, the sub-combination of a frame; an intermittently rotatable transfer receiving drum rotatably mounted in said frame; a housing mounted on said frame adapted to hold a supply of transfers; transfer feed mechanism carried by said frame beneath said housing, said mechanism comprising an axially movable and bodily tiltable tube; a suction pad mounted at one end of said tube; means for moving said tube towards and away from said housing; means for applying suction to said pad when said tube is in its forward position to cause a transfer to adhere to said pad; means for tilting said tube and suction pad towards said drum to deliver said transfer on to said drum and for returning said tube to its initial position and common operating means for intermittently rotating said drum and for actuating said tube as required during each movement of said drum.

4. In apparatus for applying transfers to glass, ceramic and other ware to be decorated, the sub-combination of: a frame; a transfer-receiving drum rotatably mounted in said frame; transfer feed mechanism associated with said drum and transfer backing removing mechanism carried by said frame, said mechanism comprising a housing pivoted to the frame above said drum for movement in the plane of said drum; a carriage slidably mounted in said housing for movement transversely of said drum; a roller mounted in said carriage and normally urged into contact with said drum or a transfer located thereon; cam actuated mechanism for bodily displacing said carriage and said roller transversely of said drum; further cam-actuated mechanism for swinging said housing around its pivot to lift said roller out of contact with said drum and means for returning said carriage and said roller to their initial positions over said drum; mechanism for intermittently rotating said drum between successive operations of said cam-actuated mechanisms and common operating means for actuating said drum-rotating and transfer feed mechanisms in required sequence.

5. In apparatus for applying transfers to glass, ceramic and other ware to be decorated, the combination with a frame; an intermittently rotatable transfer receiving drum mounted in said frame; transfer feed mechanism associated with said drum; of an expandible transfer-carrying magazine mounted on said frame adjacent said transfer feed mechanism, said magazine comprising four L-shaped elongated strips arranged at the four corners of a rectangle and interconnected by four pairs of diagonally arranged struts pivoted at their ends to the said strips, and each pair of said struts being pivoted together intermediate their ends.

6. In apparatus for applying transfers to glass, ceramic and other ware to be decorated, the combination of: a frame; a rotatable drum mounted in said frame; a driving shaft mounted in said frame; a worm fixed on said driving shaft; a driven shaft mounted in said frame; a worm wheel on said driven shaft cooperable with said worm on said driving shaft; a support for ware to be decorated associated with said drum and ware-operated lever mechanism associated with said worm-wheel for moving said worm-wheel into engagement with said worm; and means for continuously driving said driving shaft.

7. Apparatus for applying transfers to glass, ceramic and other ware to be decorated comprising in combination: a rotatable drum, means on the periphery of said drum for retaining a transfer thereon; automatic transfer feed mechanism associated with said drum; transfer backing-removing mechanism and releasable wire-supporting means also associated with said drum; said transfer feed mechanism, backing-removing mechanism and ware-supporting means being located at spaced positions around the periphery of said drum; a pivoted housing carried by said frame; a main driving shaft rotatably mounted in said housing; a gear on said shaft; means for continuously rotating said driving shaft; a cam shaft associated with said driving shaft; a second gear on said cam shaft; a plurality of cams mounted on said cam shaft; lever mechanism operatively connecting one of said cams to each said transfer feed mechanism, backing-removing mechanism and ware-supporting means; a ware operable movable stop associated with said ware support; and lever mechanism operatively connecting said stop to said pivoted driving shaft housing, the arrangement being such that on the insertion of the ware in the ware support, said stop is moved by said ware to cause said gear on said driving shaft to engage said gear on said cam shaft thereby drivingly coupling said cam shaft to said driving shaft.

8. In apparatus for applying transfers to glass, ceramic and other ware to be decorated, the sub-combination of: a frame; an intermittently rotatable transfer receiving drum rotatably mounted in said frame; a housing mounted on said frame adapted to hold a supply of transfers; transfer feed mechanism carried by said frame beneath said housing; said mechanism comprising an axially displaceable rod mounted in bearings on said frame; a compression spring surrounding said rod and located between said bearings; a tube pivotally mounted at one end on said rod; a suction pad carried by said tube at the other end thereof; means for applying suction to said pad; and means for axially displacing said rod and for tilting said tube around its pivot, said means comprising a cam shaft rotatably mounted in said frame; a first cam on said cam shaft; a projection on said tube engaging the periphery of said cam; a second cam on said cam shaft; a roller on said axially displaceable rod engaging the periphery of said cam; a driving shaft; means for actuating said driving shaft; and means for releasably coupling said driving shaft to said cam shaft.

9. In apparatus for applying transfers to glass, ceramic and other ware to be decorated, the combination with an intermittently rotatable drum comprising means on the periphery of said drum adapted to retain a transfer thereon, automatic transfer feed mechanism associated with said drum, automatic transfer backing-removing mechanism, releasable supporting means for retaining ware to be decorated in frictional rotative engagement with the periphery of said drum, said backing-removing mechanism and ware-supporting means being located at spaced positions around the periphery of said drum, means for actuating said backing-removing mechanism to remove the backing from the transfer on said drum, and means for intermittently rotating said drum so as to bring said transfer progressively into position for operation thereon by said backing-removing mechanism to remove the backing therefrom and then to bring said transfer into engagement with the rotating ware for withdrawal thereby from the drum.

10. In apparatus for applying transfers to glass, ceramic and other ware to be decorated, the combination with an intermittently rotatable drum comprising means on the periphery of said drum adapted to retain a transfer thereon, automatic transfer feed mechanism associated with said drum, automatic transfer-backing-removing mechanism, releasable supporting means for retaining ware to be decorated in frictional rotative engagement with the periphery of said drum, said backing-removing mechanism and ware-supporting means being located at spaced positions around the periphery of said drum, means for actuating said backing-removing mechanism to remove the backing from the transfer on said drum, and means for intermittently rotating said drum so as to bring said transfer progressively into position for operation thereon by said backing-removing mechanism to remove the backing therefrom and then to bring said transfer into engagement with the rotating ware for withdrawal thereby from the drum, and common driving means for actuating said drum rotating and backing-removing means in required sequence.

KENNETH GODFREY ALDRIDGE.

References Cited in the file of this patent

UNITED STATES PATENTS

| Number | Name | Date |
|---|---|---|
| 2,305,553 | Orswell | Dec. 15, 1942 |
| 2,353,352 | Muir | July 11, 1944 |
| 2,441,164 | Miller | May 11, 1948 |
| 2,546,360 | Farrow et al. | Mar. 27, 1951 |